United States Patent
Oswal et al.

(10) Patent No.: US 11,907,250 B2
(45) Date of Patent: Feb. 20, 2024

(54) WORKLOAD-AWARE DATA ENCODING

(71) Applicant: ORACLE INTERNATIONAL CORPORATION, Redwood Shores, CA (US)

(72) Inventors: Urvashi Oswal, Fremont, CA (US); Marc Jolles, Zurich (CH); Onur Kocberber, Thalwil (CH); Seema Sundara, Nashua, NH (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/871,092

(22) Filed: Jul. 22, 2022

(65) Prior Publication Data

US 2024/0028605 A1  Jan. 25, 2024

(51) Int. Cl.
| | |
|---|---|
| *G06F 16/24* | (2019.01) |
| *G06F 16/25* | (2019.01) |
| *G06F 16/21* | (2019.01) |
| *G06F 11/34* | (2006.01) |
| *G06F 16/2458* | (2019.01) |

(52) U.S. Cl.
CPC ........ *G06F 16/258* (2019.01); *G06F 11/3409* (2013.01); *G06F 16/21* (2019.01); *G06F 16/2462* (2019.01)

(58) Field of Classification Search
CPC .... G06F 16/258; G06F 16/21; G06F 16/2462; G06F 11/3409; G06F 11/3414
USPC ......................................................... 707/756
See application file for complete search history.

(56) References Cited

U.S. PATENT DOCUMENTS

| | | | | |
|---|---|---|---|---|
| 7,424,528 | B2* | 9/2008 | Cherkasova | H04L 65/1101 709/224 |
| 10,191,663 | B1* | 1/2019 | O'Neill | G06F 3/0604 |
| 10,275,489 | B1* | 4/2019 | Muniswamy Reddy | G06F 16/2453 |
| 11,308,093 | B1* | 4/2022 | Polychroniou | G06F 16/1744 |
| 11,468,031 | B1* | 10/2022 | Hazel | G06F 16/2272 |
| 11,615,012 | B2* | 3/2023 | Lee | G06F 16/21 714/47.1 |
| 11,635,916 | B2* | 4/2023 | Zalivaka | G06F 11/10 711/154 |
| 2004/0103189 | A1* | 5/2004 | Cherkasova | H04N 21/2402 709/224 |
| 2012/0016901 | A1* | 1/2012 | Agarwal | G06F 16/258 707/769 |
| 2017/0322972 | A1* | 11/2017 | Lee | G06F 16/137 |
| 2017/0344394 | A1* | 11/2017 | Ansari | H04L 47/83 |
| 2018/0314735 | A1* | 11/2018 | Liu | G06N 20/00 |

(Continued)

*Primary Examiner* — Hanh B Thai
(74) *Attorney, Agent, or Firm* — Hickman Becker Bingham Ledesma LLP; Khachatur V. Papanyan

(57) ABSTRACT

Techniques are described for executing machine learning models trained for specific operators with feature values that are based on the actual execution of a workload set. The machine learning models generate an estimate of benefit gain/cost for executing operations on data portions in the alternative encoding format. Such data potions may be sorted based on the estimated benefit, in an embodiment. Using cost estimation machine learning models for memory space, the data portions with the most benefits that comply with the existing memory space constraints are recommended and/or are automatically encoded into the alternative encoding format.

20 Claims, 4 Drawing Sheets

(56) References Cited

U.S. PATENT DOCUMENTS

| | | | |
|---|---|---|---|
| 2019/0294615 A1* | 9/2019 | Plattner | G06F 16/2282 |
| 2019/0310871 A1* | 10/2019 | Desmouceaux | H04L 45/586 |
| 2020/0084112 A1* | 3/2020 | Kandaswamy | H04L 41/0823 |
| 2020/0125568 A1* | 4/2020 | Idicula | G06N 20/20 |
| 2021/0089532 A1* | 3/2021 | Patel | G06F 16/24542 |
| 2022/0083542 A1* | 3/2022 | Thiyagarajan | G06F 18/24765 |
| 2022/0083548 A1* | 3/2022 | Thiyagarajan | G06F 18/24765 |
| 2022/0138199 A1* | 5/2022 | Idicula | G06F 16/24545 707/718 |
| 2022/0309063 A1* | 9/2022 | Du | G06F 16/24557 |
| 2022/0326876 A1* | 10/2022 | Zalivaka | G06F 3/0619 |
| 2023/0121060 A1* | 4/2023 | Teixeira de Abreu Pinho | G06F 16/9024 707/798 |
| 2023/0171163 A1* | 6/2023 | Gudipati | H04L 41/5054 709/224 |

* cited by examiner

WORKLOAD-AWARE DATA ENCODING

FIELD OF THE INVENTION

The present invention relates to database management systems, in particular to workload-aware data encoding.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Given that the cost of volatile memory (also sometimes referred to as "main memory") is decreasing and the capacity of volatile memory in computers is increasing, more data can be cached from disk storage to volatile memory. Such caching allows applications to access data more quickly and to execute faster.

However, a number of challenges still remain with making data accessible in volatile memory. Firstly, the amount of data that is typically used by applications has also significantly increased. Particularly, to completely cache larger amounts of data (colloquially referred to as "big data") in volatile memory would require an exuberant amount of volatile memory. Thus, regardless of the size of volatile memory, there may still exist data (and, in some cases, a signification portion of data) that could not be concurrently cached in the volatile memory. Such data would be accessed from disk storage and loaded into the cache on an as-needed basis (replacing other data in the cache).

When a database system needs to perform operations on non-cached data, the data in the disk storage needs to be first read from the disk storage into the volatile memory of the database system. Once loaded into volatile memory, the database system can perform the operations on the data. However, reading data from disk storage generally incurs a significant performance penalty compared to obtaining data that already resides in volatile memory. Thus, when a database system needs to perform operations on non-cached data, the database system fails to experience significant performance gains from the fact that the database system has a large amount of volatile memory.

One approach to fit more data onto volatile memory is to encode the data with high compression before (or during) storing the data in the volatile memory. Once encoded, the data occupies less space in the volatile memory. However, not all data can be significantly encoded. Furthermore, if the encoded data is frequently accessed for operations, the data would need to be frequently decoded to be used. Such frequent decoding uses compute resources that otherwise could have been used for data operations, slowing the data operations and, consequently, the applications that requested the data operations. Accordingly, there is a significant drawback in unselective data compression for data cached in volatile memory.

Furthermore, no matter the level of compression reached for data stored in volatile memory, at some point, the database system would still run out of space in volatile memory to store more data. Thus, when the volatile memory is at full capacity and the database system needs to perform an operation on data that is solely stored on disk storage, some of the data already in the volatile memory would need to be replaced to make room for the data from the disk storage. The more frequent such replacements, the more computing resources are wastefully spent on shuffling data in and out of the volatile memory. Thus, minimizing the frequency of data replacement would contribute to the efficient performance of the database system.

Yet another approach is the use of distributed systems, thereby increasing the amount of volatile memory that is available for storage. However, distributed systems add to the overhead of network latency. The nodes of the distributed systems are interconnected by the network, and distributing/aggregating results requires additional time spent on transferring data through the network. The more data is transferred, the greater is the network latency to generate results.

DETAILED DESCRIPTION

Figure 1:
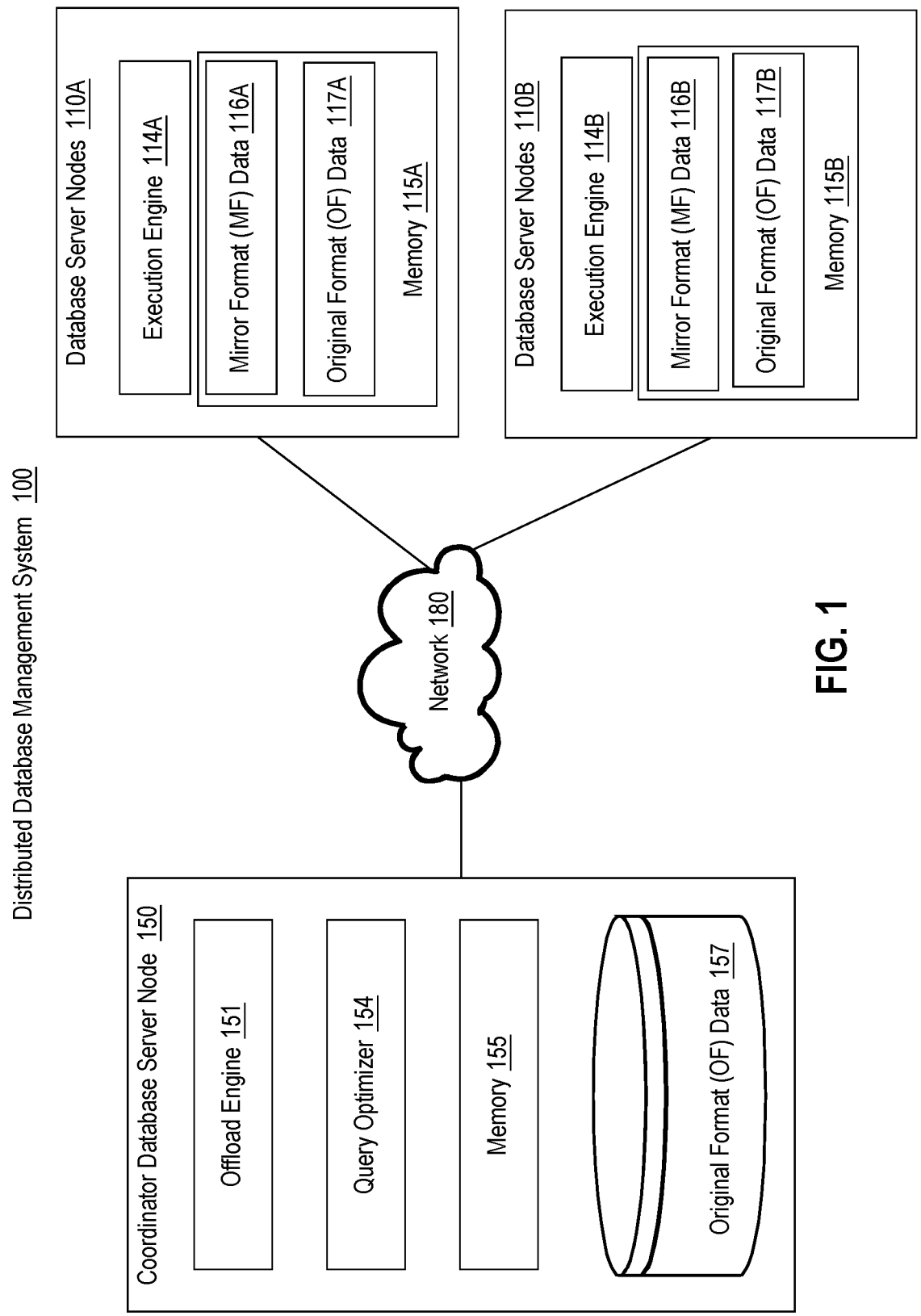
FIG. 1 is a block diagram that depicts distributed database management system (DDBMS) 100, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Different data (representation) formats have different benefits. Therefore, techniques are described herein for determining which data format to use for data portions referenced in a workload set of queries to maximize the performance of the workload set based on the existing resources. The term "workload set of queries" or "workload set" refers to a set of queries for which the estimated benefit/cost measurement(s) for alternative encoding of data portion(s) are determined. Data portion refers herein to any portion of data managed and maintained by a database management system, such as column(s), row(s), segment(s), or table(s).

In an embodiment, the workload set of queries may be automatically captured by DBMS based on the frequency/resources consumed by execution of queries and/or selected based on the input from a user. The workload set may represent the most typical set of queries that are executed by the DBMS. For example, in the distributed DBMS, such a workload set may include OLAP (Online Analytical Processing) queries. The OLAP queries are generally read oriented queries that may include a large number of scans, base relation (e.g., join operation) and sort operations with predicate evaluation(s) on large data sets.

The workload set may reference various data portions (e.g., columns), which are referred to herein as "candidate data portions." A candidate data portion may be stored in a DBMS in a particular encoding format having its own execution benefits. However, these execution benefits may not match the usage of the candidate data portion in the workload set.

In an embodiment, the encoding of the data format may be different based on where the data is stored: volatile memory or persistent storage. However, once loaded into memory for operation, the data portion's encoding may be changed or preserved depending on the benefits of the operations on the data portion. For example, one data portion may be persistently maintained in one format (and in some embodiments, only in that format), and another (or the same) data portion may be encoded and loaded into volatile memory in another format. Techniques are described for analyzing a query workload set to estimate the benefit/cost measurement of the workload set execution when candidate data portion(s) encoding format is altered to an alternative encoded format when used in the execution.

The format that corresponds to the data's original format (e.g., the on-disk/persistent storage format) is referred to herein as the "original format" or "OF". Data that is in the original format is referred to herein as OF data. For example, string data of a column may be originally stored encoded in the variable-length format (VARLEN). The alternative format in which the data portion may be loaded into memory (e.g., volatile memory) is referred to herein as a "mirror format" or "MF". Data that is encoded in the mirror format is referred to herein as MF data. For example, string data of a column may be mirrored in memory in the dictionary encoding format.

An operation on MF data, as opposed to OF data, may execute longer or shorter due to de-compression and network delays required by operation(s) of the query in the workload. For example, if a query performs a base relation operation on a column that is in MF data, the data needs to be decoded and moved to common nodes with the other column values in the base relation. Thus, such an operation would incur both decoding costs and, in some cases, network costs. On the other hand, if a scan operation is performed with a predicate on the same column in MF data, the scan operation completes quicker as the predicate condition would be evaluated on compressed values (e.g., integers for dictionary encoding) accessed from memory as compared to full string comparison that may be required for the same column in OF data. Even for the same operation, the usage of a data portion in a query may affect the benefits of the different formats. For example, although scanning with the predicate may be faster in MF data, however, if the data portion is returned by the query, then the data portion is to be decoded back into OF data.

Accordingly, various factors, such as execution statistics and data statistics of a data portion in the query operations, are used to determine whether to encode the data portion in the MF data or use OF data. The DBMS executing on a distributed cluster of nodes may add additional factors, such as the number of nodes and/or the size of memory on each node (especially the coordinator node).

In an embodiment, the measurements of such factors may be used as features for training a machine learning algorithm to generate machine learning model(s) that estimate the benefit/cost measurement for operation(s), if the data portion(s) were to be encoded in alternative encoding(s). Non-limiting examples of benefit/cost measurements are a performance gain in time units (e.g., ms) or required memory size (MB) for an operation. If a candidate data portion is stored in OF data, the machine learning model may estimate the performance gain (if any) of an operation on the candidate data portion if the data portion were accessed from MF data. Conversely, if the candidate data portion is stored in the MF data, the machine learning model estimates the performance gain (if any) of the operation when the candidate data portion is accessed from the OF data.

In an embodiment, a training set of queries are selected, which may be different from the workload set of queries. The DBMS analyzes each of the queries to obtain the data statistics for the data portion(s) referenced in the operation(s) of the queries. The DBMS accesses the data and pre-execution statistics regarding the relevant data portions and generates training data set of features. The DBMS may generate further features by executing the training set of queries one or more times and by collecting execution statistics. The training data set is arranged by feature values for each data portion and the operation(s) thereof, in an embodiment.

To generate the result set for the training data set, the DBMS may modify the format in which one or more of the data portions referenced by the training set of queries are executed by encoding the data portions in the alternative format and storing the data portions in the memory. After the encoding, the DBMS executes the training set of queries again to collect execution time statistics. Based on the execution time statistics, the DBMS determines performance cost/gain information for each data portion and the operation(s) thereof, thereby generating result set values for each data portion and the operation(s) thereof, in an embodiment.

Using training data set of feature values, machine learning algorithm(s) are selected and trained for each type of query operator (or combinations thereof) to yield corresponding machine learning models, in an embodiment. A trained machine learning model for an operator may receive as input the feature set values of data portion(s) (same as the feature set used in the training) and generates an estimate of performance gain for altering the encoding of the data portions. Additionally or alternatively, machine learning model(s) are similarly trained to predict the size of the distributed system (number of cluster nodes) and the memory requirement for storing encoding metadata, such as the dictionary of values for the dictionary encoding format.

The DBMS maintains machine learning model(s) and executes the models to estimate performance/gain cost for a particular workload set. To determine the feature set values of the particular workload set, the DBMS accessed data statistics and estimated execution statistics (from the query optimizer) of the candidate data portions. Additionally, the DBMS executes the particular workload set one or more times to generate execution statistics for the candidate data portions and the operations thereof. The DBMS uses the execution statistics to obtain additional feature value(s) for the model.

The DBMS provides the collected feature values as input to the machine learning model(s) to generate an estimation of performance gain for an operation on a candidate data portion of the particular workload set (if any). The machine learning models would generate the estimate of performance gain if one or more of the data portions were modified to alternative encoding. The output of the model may reflect a performance cost by, as an example, outputting a negative value for the performance gain.

For example, the DBMS analyzes a query of a workload set to determine the list of base relations and columns returned by the query. The DBMS obtains data statistics and pre-execution statistics for a candidate column that is currently only stored in VARLEN format. The candidate column participates in a scan operation in the query. To determine whether the scan operation may be improved, the DBMS accesses execution statistics from the previous execution(s) of the scan on the candidate portion in its current encoding. DBMS generates the necessary feature values based on the collected data, pre-execution, and post-execution statistics and provides the feature values as input to the machine learning model for the scan operator. The machine learning model for the scan operator calculates an estimate of performance gain in time units if the scan operation is performed on the dictionary-encoded candidate column rather than a VARLEN string column.

In an embodiment, the DBMS may include multiple machine learning models, each for different query operators (e.g., scan, decode, partitioning, group-by), for different costs (e.g., network delay, memory size), and for encoding type and/or combinations thereof. For example, a machine learning model may be trained to determine a base relation operation's network cost when altering from OF data to MF data.

Since the same data portion may be an operand of different operators within the workload set, multiple performance gain estimates may be generated by the corresponding multiple machine learning models. The performance gain estimates are summed to determine whether the alternative encoding for the data portion would yield a total performance gain. If the summation of the estimates is performance loss rather than gain, the data portion is removed from the consideration for the alternative encoding.

Continuing with the example of the candidate column, in another query, the same candidate column may also be returned by such a query. In such a case, the DBMS has to decode the candidate column from dictionary encoding (MF) into the VARLEN string format (OF). To estimate the performance cost for the decoding operation, the DBMS invokes the decoding operator model (for the join operation) with the corresponding feature set values. The total estimated performance gain and cost may determine whether the candidate column is to be encoded in the dictionary encoding or left in the VARLEN string format.

After one or more data portions of the workload set are modified to be encoded into an alternative format based on the evaluation results, the DBMS may re-execute the workload set and collect new execution statistics for the newly encoded candidate data portion(s). Using the new feature values and the data statistics about the candidate data portion(s), the DBMS may again execute the machine learning model(s) to determine if any performance gain may be additionally obtained. Even if a candidate portion has been previously estimated to have a performance gain in the new encoding format, due to the changes in the encoding formats of other candidate data portions of the workload, the machine learning model may still determine that reverting to the original format for the candidate portion may yield a performance gain. The evaluation techniques may be repeated as many times as necessary to obtain the most optimized encoding for candidate data portions for performance gain and the cost of the workload set.

System Overview

FIG. 1 is a block diagram that depicts distributed database management system (DDBMS) 100, in an embodiment.

Although the techniques described herein are applicable to any type of DBMS, the techniques are particularly beneficial to distributed database management systems such as Oracle® HeatWave. Distribute database management systems, such as DDBMS 100, has multiple nodes interconnected by a network, such as network 180. Accordingly, to execute operations, data is constantly shuffled around the nodes, which makes the size of data critical to reducing network latency. For that reason, having alternative MF encoding (e.g., dictionary encoding) for data that is lightweight may provide a significant performance improvement.

In an embodiment, DDBMS 100 includes one or more database servers, such as coordinator database server node 150, database server node 110A, and database server node 110B. Each of these database server nodes may collectively or individually be a separate database management system, which is described in more detail hereafter, specifically in the "Database Management Systems" section.

DDBMS 100 is a distributed computing system that includes a cluster of nodes which is described in more detail hereafter, specifically in the "Computing Nodes and Clusters" section. DDBMS 100 includes coordinator database server node 150 and database server nodes 110A and 110B, which are interconnected by network 180. The database server nodes are also referred to herein as "worker nodes." Although only two worker nodes 110A and 110B are depicted, other embodiments may include more or less than two worker nodes. Typical cluster configurations may include 2-64 worker nodes.

Query Execution

In an embodiment, coordinator database server node 150, also referred to herein as "coordinator node," stores and serves up database objects for DDBMS 100. Coordinator database server node 150 serves up data in response to a request of applications running on the client system(s) (not depicted in FIG. 1). The execution of queries requested by such applications is referred to herein as "production execution" of queries.

On the other hand, executions of queries (such as a workload set of queries) to tune the performance of DDBMS 100 are referred to herein as "test executions." The test executions differ from production executions by their lack of modification of the actual data stored in DDBMS 100. Even if DDBMS 100 captures the query(ies) for the workload set from production executions, DDBMS 100 ensures that no modification of the actual data takes place due to the execution of the workload set. Although DDBMS 100 may test execute a query using coordinator node 150 and/or work nodes 110A/B, the analysis of the queries (such as running of the machine learning models described herein) may be performed on a separate computer system. Any reference to the execution of a workload set (or queries/operations thereof) herein is a test execution.

To execute a query, DDBMS 100 may first convert the query into an execution plan. As used herein, an "execution plan" is an ordered set of operators used to access data in a database management system. Each operator may contain one or more data operations on the output data of another operator or on database objects. Query optimizer 154 receives a query as an input and generates an execution plan for the query, in an embodiment. Query optimizer 154 may include a plan generator that generates one or more alternative execution plans for the query. Plan generator may generate those plans based on an analysis of access paths for database objects, operations described in the query, and/or pre-execution statistics thereof. Based on the analysis, the plan generator may produce a permutation of execution plans.

After selecting an optimal execution plan for a query, coordinator node 150 obtains and executes the execution plan, in an embodiment.

Offload Engine

Coordinator node 150 includes offload engine 151 for offloading operations to be executed on worker nodes 110A/B. Work nodes 110A/B include mirror format (MF) data 116A/B and original format (OF) data 117A/B that store one or more data portions in memory 115A/B that are also stored in OF data 157 of coordinator node 150. Since the data potion(s) in MF data 116A/B are in MF encoding format, which is smaller, operations such as scans, partitioning, and/or aggregate operations may be faster compared to the operations on the same data portions in OF data 117A/B. However, MF data 116A/B requires additional decoding for join operations and producing the result set on coordinator node 150.

Offload engine 151 may analyze the execution plan generated by query optimizer 154 and determine if any operation of the execution plan can be offloaded to be performed by worker nodes 110A/B. In order for an operation to be offloaded for execution on worker nodes 110A/B, the data portion(s) referenced in the operation have to be loaded into memory 115A/B. The amount of data portion(s) that are stored in MF data 116A/B may also be limited by the amount of available memory in memory 155. Offload engine 151 may store MF data encoding metadata (e.g., dictionary of encoded values) in memory 155 for decoding the result data from offloading and for base relation operations.

Additionally, even if the data portion(s) are loaded in MF data 116A/B, offload engine 151 may further determine whether the benefit of execution of an operation on worker nodes 110A/B is greater than the cost of decoding the resultant MF data for a later base relation operation or production of the result set.

When offload engine 151 determines that an operation of an execution plan is to be offloaded onto worker nodes, offload engine 151 may invoke execution engines 114A/B of worker nodes 110A/B to execute the operation. The operation may involve partitioning the data portion(s) between worker nodes 110A/B.

Workload-Aware Encoding Selection

Figure 2:
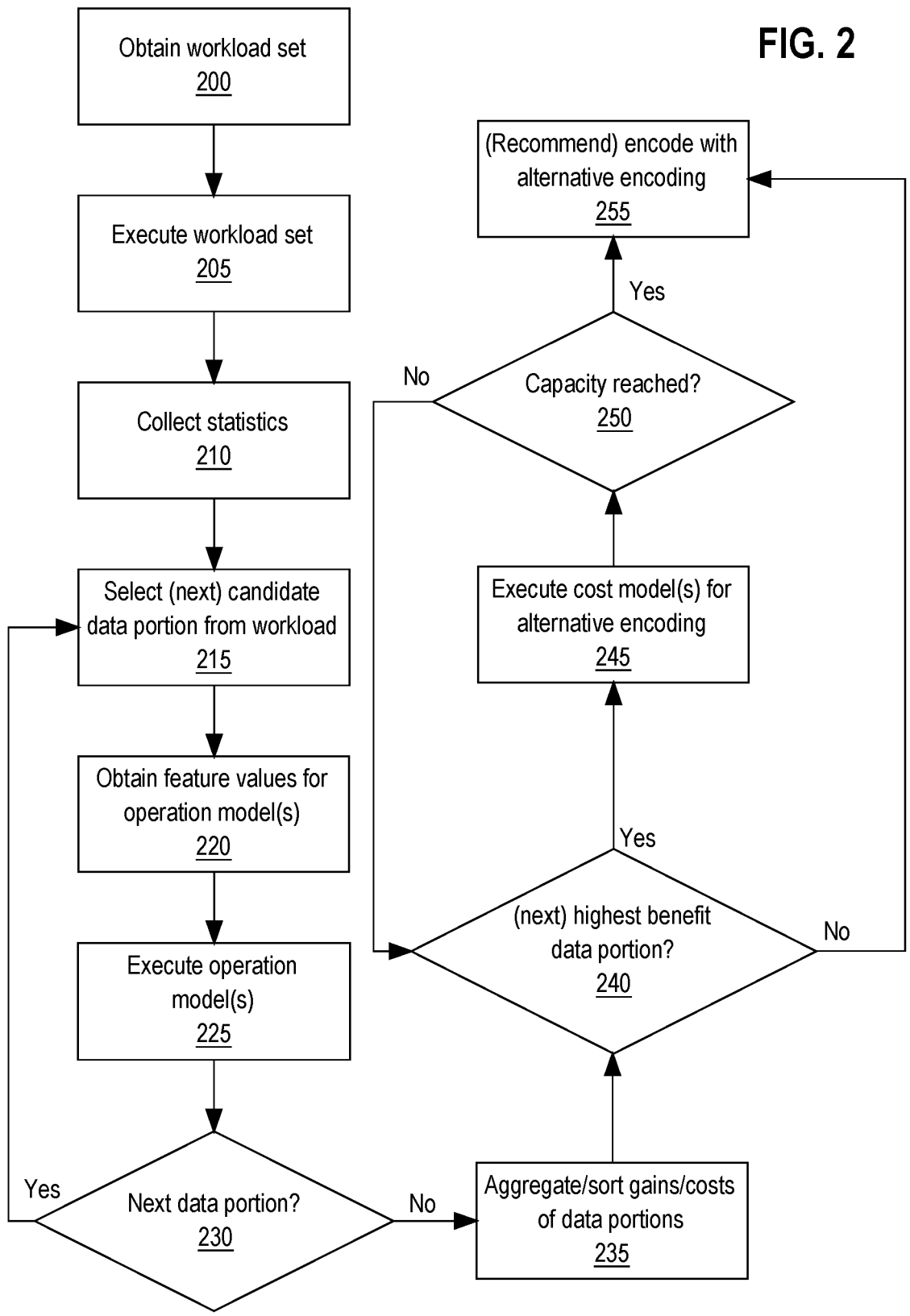
FIG. 2 is a flowchart that depicts a process for determining estimated benefits/costs of encodings data portion(s) referenced in a workload set in an alternative encoding format, in an embodiment.

FIG. 2 is a flowchart that depicts a process for determining estimated benefits/costs of encoding data portion(s) referenced in a workload set in an alternative encoding format, in an embodiment. DDBMS 100, during the production execution, may receive numerous various queries referencing a variety of data portions. If all referenced data portions were to be encoded in MF data 116A/B, then offload engine 151 may make a determination purely on operation cost. However, since even large clusters have volatile memory limitations, only a subset of referenced data portions may be encoded into the mirror format.

According to one embodiment, the mirror format is completely independent of the original format. However, the MF data is initially constructed in volatile memory based on the persistently stored OF data and not based on any persistent MF structures. Since persistent MF structures are not required, users of existing databases need not migrate the data or structures in their existing databases to another format. Thus, a conventional database system that uses uncompressed data (e.g., in OF format) may continue to use that format to persistently store its data without performing any data migration while still obtaining the memory space benefit that results from having a compressed representation of the data available in faster volatile memory (e.g., in MF format).

For example, the mirror format of DDBMS 100 may be a dictionary-encoding format for strings, while the original format of DDBMS 100 may be a VARLEN encoding format for strings. The mirror format for a column of strings may be generated by generating a dictionary mapping for the strings and storing the dictionary in memory 155. DDBMS 100 may then load the dictionary encoded values for the column into MF data 116A/B of worker nodes 110A/B.

The MF data mirrors data that already exists in the OF data. However, while all items in the MF data are mirror versions of corresponding items in the OF data (albeit organized in a different format), not all items in the OF data need to be mirrored in the MF data. Thus, the MF data may be a subset of the OF data.

For example, DDBMS 100 may dictionary encode as many columns as there is memory space to store the corresponding dictionaries in memory 155 or to store the corresponding dictionary-encoded values in MF data 116A/B in memory 115A/B.

To maximize offloading of operations by offload engine 151, the data portions that are most frequently accessed and have performance benefits, when in MF, are to be stored in MF data 116A/B. To determine which data portions qualify to be MF encoded and which should stay OF encoded, DDBMS 100 analyzes a workload set of queries to make a workload aware determination as to which candidate data portions are to be encoded in MF data 116A/B (and conversely, which data portions should be OF data 117A/B or 157).

Continuing with FIG. 2, at step 200, DDBMS 100 obtains a workload set of queries to maximize the performance of the execution of the queries in the workload set. The queries may be selected for the workload set based on the duration of execution (heavy hit queries), frequency of execution, and/or user input (DBA).

Training Machine Learning Algorithm

DDBMS 100 may estimate performance gain if a workload set operation were to execute on a candidate data portion encoded in an alternative encoding format. Such estimation may be determined based on the properties of the data portion and the operation.

In an embodiment, a machine learning model is used for such estimation. The machine learning model is generated by training a machine learning algorithm with a large training data set. Different regression-based machine learning algorithms may be used for the training (e.g., linear regression, non-linear regression, generalized linear model (GLM) with exponential functions algorithm). The training data set includes feature values corresponding to properties of the data portions and the operations with the results of the actual performance gains/cost measurements when the operations were executed on the data portions in the alternative encoding.

Since larger training data set provides for more accurate generated model(s) in estimating performance gain/cost, a large amount of computing resources is used to train the model. Accordingly, the training of the machine learning algorithm(s) to generate the corresponding machine learning model(s) may be performed offline in a close to an infinite resource computing environment. The trained machine learning model is then installed on and maintained by DDBMS 100 to execute to estimate performance gain/cost of data portions.

In an embodiment, a separate machine learning model is generated for different operators, data types, different encodings, and/or combinations thereof. For example, one machine learning model may be trained for estimating the performance gain of a table scan operation for modifying encoding from a VARLEN format to a dictionary-encoded format, another machine learning model may be trained for a table scan operator for modifying encoding from dictionary-encoded to VARLEN format, and yet another may be trained for an aggregation/sort-by operation for modifying into an alternative encoding. Accordingly, DDBMS 100 may execute multiple machine learning models to determine the performance gain of a query that contains multiple operations.

Such multiple machine learning models may require as input a different set of features. Each feature set describes the properties of a data portion and/or execution properties of operation on the data portion.

Features Based on Statistics

The features describing properties of data portions are captured in data statistics, in an embodiment. The term "data statistics" refers herein to numerical representations for quantifying the data distribution and storage characteristics of the data stored in a database system. In an embodiment, data statistics are collected for any granularity data portions.

Non-limiting examples of data statistics include:
Number of rows—describes the number of rows in a data portion.
Number of blocks—describes the number of data blocks in a data portion.
Average row/entry length—describes an average entry length in a data portion, and if the data portion is a table, then an average row length.
Number of distinct values (NDV) in a column—describes a number of unique values in a column in a data portion.
Cardinality—a number of non-null and non-empty values in a column in a data portion.
Width—describes the maximum data length of entries in a data portion
Collation type—describes how strings are compared (e.g., case insensitive, accent insensitive)
Data distribution statistics—describe the distribution of values in a column of a data portion. Data distribution statistics include the minimum, maximum, average, and median values in the column. In one embodiment, in addition to the median value, the distribution statistics may include more complex statistics for the frequency of values, referred to herein as histogram statistics. Histogram statistics for a column are generated by arranging the values in the column and then bucketing the values based on the values themselves or on the number of values in each bucket. Based on histogram statistics, popular (frequent) and non-popular (non-frequent) values and value ranges in a column may be determined and tracked as part of the data distribution statistics.
Other data statistics may include any combination of the above statistics of an application of one or more statistical functions, such as a minimum, maximum, average, median, and standard deviation on one or more of the above-described statistics.

The features describing properties of operation execution are captured in execution statistics, in an embodiment. The term "execution statistics" refers herein to a numerical representation of the estimated or actual results of an operation. The estimated execution statistics are generated by a query optimizer, while the actual execution statistics are obtained from post-execution logs after performing the operations on the data portion in the current encoding format.

Non-limiting examples of system statistics include:
Estimated and actual number of rows processed,
Estimated and actual number of rows returned,
Estimated and actual maximum width of entries processed,
Estimated and actual maximum width of entries returned,
Operation execution time, and
Number of sub-operations.

In an embodiment, the execution statistics are collected per operation type for one or more data portions. The execution statistics may be associated with the data portion and the operation type for which it was collected. Other information is also associated with execution statistics, such as the data type and data statistics of the data portion for which the execution statistics were collected.

Continuing with FIG. 2, at step 205, execution statistics are collected about operations and candidate data portions in the workload set by executing the workload set one or more times. The execution of the workload set improves the accuracy of query optimizer 154 because query optimizer 154 may use historical statistics about the executions to estimate execution properties of operations and the respective candidate data portions. Additionally, the execution of the workload set generates actual execution statistics for each candidate data portion and the operation(s) thereof.

At step 210, DDBMS 100 collects the statistics for the candidate data portions of the workload set. In an embodiment, coordinator node 150 may access execution statistics of executions on worker nodes 110A/B and its own node from the respective execution logs. Coordinator node 150 may store the statistics in a system table per candidate data portion and/or per operation. Coordinator node 150 may further store data statistics about the candidate data portion per candidate portion in the system table. Accordingly, after the execution(s) at step 205 and the statistics collection at step 210, DDBMS 100 has full access to data and execution statistics of the candidate data portions and operations of the workload set. Such feature data sets may be arranged by feature values for each data portion and the operation(s) thereof.

Machine Learning Models

In an embodiment, one or more measurements of data statistics and/or execution statistics are used as feature(s) for training a machine learning model and then as input to the machine learning model to estimate performance gain/cost.

Non-limiting examples of such machine learning models include:
1. Decoding operator model that includes features such as:
   a. Number of distinct values (NDV) in the data portion participating in the decoding operation,
   b. Cardinality (non-null/empty values) in the data portion,
   c. Number of rows in the data portion, d. Number of rows returned from the operation,
e. Operation duration.

In an embodiment, DDBMS 100 determines that a data portion referenced in a query of a workload set, if converted to an alternative format, is to be decoded. For example, a column that is currently in OF format, if in MF format, is to be decoded when participating in base relation operation and/or returned as part of the query result set. The model estimates the performance cost for the column if converted to MF format.

2. Table scan operator model that includes features such as:
    a. Operation duration,
    b. Decompress operation duration,
    c. Estimated and actual number of rows processed,
    d. Estimated and actual number of rows returned,
    e. Actual maximum width processed,
    f. Actual maximum width returned.

In an embodiment, DDBMS 100 determines that a data portion referenced in a query of a workload set has a table scan operation. DDBMS 100 may further determine whether such data portion participates in a base relation operation and/or is returned as part of the query result set and thus is to be decoded. In such an embodiment, decoding operation time is used as a feature for the model. For example, for a column in OF data having VARLEN encoding, a zero-padding decoding operation is performed on the data portion.

3. Local partitioning operator model for base relation and group-by operators:
    a. Number of local partitioning sub-operations within the base relation and group-by operation;
    b. Operation duration;
    c. Estimated and actual number of rows processed,
    d. Estimated and actual number of rows returned,
    e. Actual maximum width processed,
    f. Actual maximum width returned.

In an embodiment, DDBMS 100 determines that a data portion referenced in a query of a workload set participates in the base relation or group-by operation. Thus, if converted to the alternative format, the data portion is to be partitioned across worker nodes 110A/B or, conversely, avoid partitioning operation. For example, a column that is currently in OF format, if in MF format, when participating in base relation operation and/or group-by operation, is to be partitioned. The model determines the estimated performance cost/benefit after modifying the format. Since the MF format decreases the size of the data portion compared to the OF format, the partitioning operation executes quicker. On the other hand, if the data portion is encoded in OF format, then the decoding for comparison with other data portions in base relations takes lesser time.

4. Group-by-operator model that includes features such as:
    a. Operation duration
    b. Estimated and actual number of rows processed,
    c. Estimated and actual number of rows returned,
    d. Actual maximum widths processed,
    e. Actual maximum width returned.

In an embodiment, DDBMS 100 determines that a data portion referenced in a query of a workload set participates in a group-by operation. Based on the provided values for the above feature(s), the model generates performance gain/cost for the data portion in the alternative format. For example, if the data portion were to be converted into a dictionary format from a VARLEN format, the group-by operation would be performed on integers and, thus, would yield an estimated performance gain.

5. Network cost model for a base relation/group-by operator:
    a. Network time
    b. Estimated and actual number of rows processed,
    c. Estimated and actual number of rows returned,
    d. Actual maximum widths processed,
    e. Actual maximum width returned.

In an embodiment, DDBMS 100 determines that a data portion referenced in a query of a workload set participates in the base relation or group-by operation. Thus, the data portion is to be distributed (partitioned) across worker nodes 110A/B through network 180 for the execution of the operation. Accordingly, the operation based on the different formats incurring different network costs. For example, a column that is currently in OF format, if in MF format, when participating in base relation operation and/or group-by operation, is to be distributed across worker nodes A/B. The model determines the estimated performance cost after modifying the format. Since the MF format decreases the size of a data portion compared to the OF format, the network times are decreased. On the other hand, if the data portion is encoded in OF format, then the decoding for comparison with other data portions in base relations takes lesser time.

6. Cluster size cost model (e.g., number of nodes with pre-configured memory size and/or total memory size of the cluster nodes) that includes features such as:
    a. Average width
    b. Cardinality
    c. Collation type 7. Dictionary size model that includes features such as:
    a. NDV
    b. Average width
    c. Cardinality
    d. Collation type The cluster size cost model and dictionary size model are cost estimation models for determining the amount of memory that would be required for the data portion to be stored and maintained on worker nodes 110A/B.

Estimate Operation Performance

DDBMS 100 maintains trained machine learning model(s) to accurately estimate benefit gains/costs for alternative formats of candidate data portions referenced in a workload set, in an embodiment. Continuing with FIG. 2, at step 215, DDBMS 100 selects a candidate data portion of the workload set to determine the performance gain/cost for alternative encoding of the candidate data portion. The candidate data portion may have participated in multiple operations of the workload set and may have different statistics for each such operation. For example, a VARLEN column may have participated in the scan with a predicate operation, then in a join operation with another column and is selected for output (e.g., referenced in the SELECT clause). Accordingly, for such a column, separate measurements of statistics exist for the scan with predicate operation and the join operation.

At step 220, for each operation on the selected data portion, DDBMS 100 obtains the feature set values from execution statistics and/or data statistics. For example, the decoding machine learning model has a feature set that includes NDV from data statistics of the selected data portion and an actual number of rows returned by the operation on the selected data portion when the same operation was previously performed in the current encoding format.

At step 225, DDBMS 100 invokes the machine learning model for the operator of the operation (and/or for the current encoding of the selected data portion) with the feature set values required by the machine learning model and obtained at step 220. In an embodiment in which the data portion participates in multiple operations, and such operations have corresponding machine learning models, DDBMS 100 invokes each corresponding machine learning model with the respective feature set values obtained for the selected data portion.

Continuing with the example of the VARLEN column participating in the predicate scan and join operation, the machine learning models for scan and base relation operator are executed. The performance gain output of the models would determine whether encoding the VARLEN column in a dictionary encoding format will increase the performance of the workload. DDBMS 100 retrieves feature values for the scan operator model, such as previous duration of the scan operation on the column, estimated and actual number of rows processed for the scan operation, estimated and the actual number of rows returned from the scan operation, and others. DDBMS 100 provides those values to the scan operator model and executes the model. The scan operator model outputs the estimated performance gain in milliseconds for scanning the column in dictionary encoding. Because the column also participates in a join operation, the local partitioning model and the network cost model are invoked with the respective feature set values for the column. Additionally, because the VARLEN column is an output column, the encoded results from the column are to be decoded if encoded in dictionary encoding. Therefore, DDBMS 100 executes the decoding operator model with the corresponding feature set values for the column. The output from each of the models represents the benefit gain/cost of the column being alternatively encoded.

At step 230, DDBMS 100 determines whether another data portion is referenced in the workload set operations. If so, the process proceeds to execute steps 215-225 to determine performance gain/cost for the next data portion of the workload set. Otherwise, the process transitions to step 235.

At step 235, DDBMS 100 aggregates the estimated benefit gains and costs for each data portion's alternative encoding. If, at step 235, the aggregation yields a cost for performing operations on the candidate data portion in the alternative encoding format, then the candidate data portion is removed from any further consideration, in an embodiment. The candidate data portion that has a total estimated benefit qualifies for the alternative encoding. Such candidate data portions are referred to herein as qualified data portions and are sorted based on the aggregate benefit gain per step 235.

Continuing with the above example of the output VARLEN, the benefit gains or costs from each of the executed machine learning models are summed together to determine the total estimated benefit or cost. If the total for the alternative dictionary encoding for the column is a cost, then the column is removed from any further consideration and remains in the same VARLEN encoding. However, if the total is a benefit gain in performance, then the VARLEN column qualifies to be re-encoded into a dictionary encoding.

At step 240, the qualified data portions are selected from the highest aggregate estimated benefit gain to the lowest. The process continues to evaluate qualified data portions until either the resources are exhausted or there are no further qualified data portions, in an embodiment. At step 245, one or more cost models are executed for the selected qualified data portion to determine if the DDBMS 100 has enough resources for the selected qualified data portion to be encoded in the alternative encoding.

For example, for a qualified data portion to be encoded in a dictionary encoding, memory 155 has to have enough memory space to store the dictionary of values for the data portion. Accordingly, the dictionary size machine learning model is executed with the corresponding feature set value for the selected qualified data portion to estimate the size of the dictionary object. Based on the output of the model and the available space on memory 155, DDBMS 100 may determine whether the column can be re-encoded into the dictionary encoded format. Similarly, the cluster size model may be executed with the corresponding feature value set for the selected qualified data portion to estimate the amount of cluster memory that would be occupied by the selected qualified data portion in the alternative encoding format, in an embodiment.

At step 250, if the process determines that the resource capacity of DDBMS 100 has not been reached, the process proceeds to step 245 to evaluate the next qualified data portion with the next highest benefit.

When either DDBMS 100 runs out of resources for converting a data portion in an alternative encoding format, at step 250, or no further data portion has qualified for the conversion, the process proceeds to step 255.

At step 255, DDBMS 100 may automatically convert the encoding for the highest qualified data portions that have been determined to fit within resources DDBMS 100. Alternatively, DDBMS 100 may provide recommendation data for the DBA of DDBMS 100 to select from the highest qualified data portions that have been determined to fit within resources DDBMS 100 to be converted to an alternative encoding.

Database Management System Overview

A database management system (DBMS) manages a database. A DBMS may comprise one or more database servers. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In embodiments, the databases may be structured as key-value stores (e.g., NoSQL or JSON) where different database objects may represent different data structures. Key-values and associated objects can be referenced, for example, by utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL; some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 3:
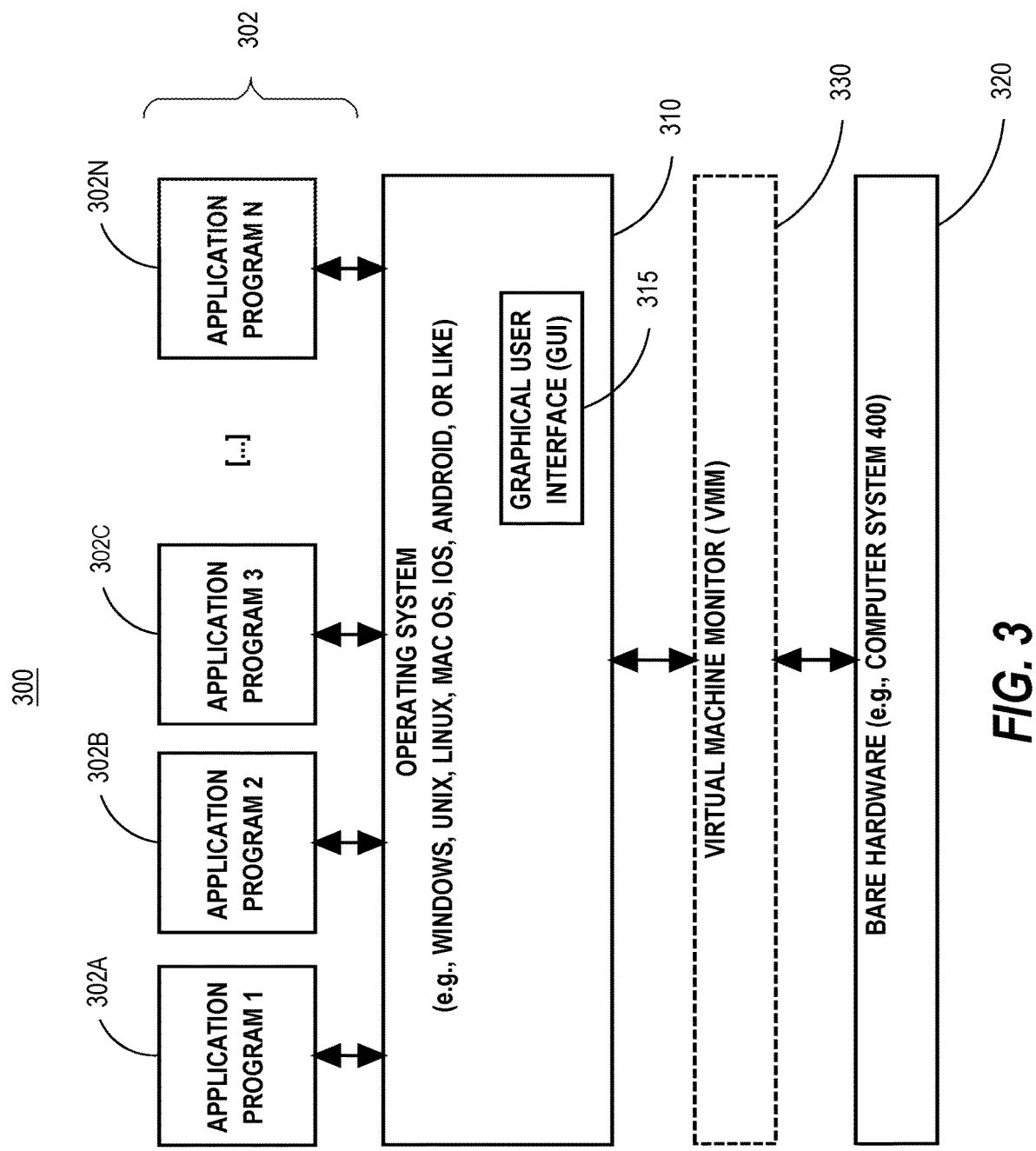
FIG. 3 is a block diagram of a basic software system, in one or more embodiments.
Figure 4:
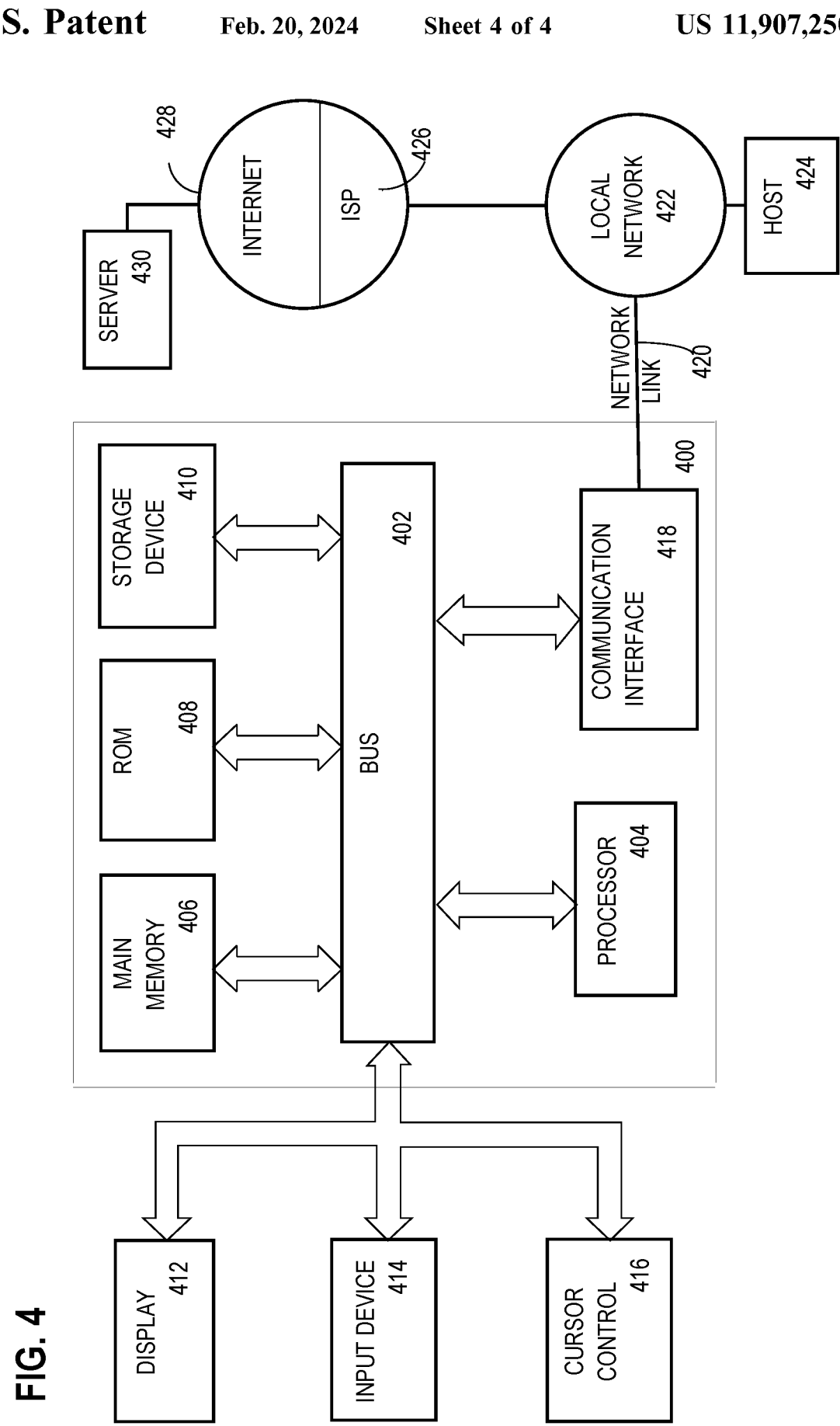
FIG. 4 is a block diagram that illustrates a computer system upon which an embodiment of the invention may be implemented.

FIG. 3 is a block diagram of a basic software system 300 that may be employed for controlling the operation of computing system 400 of FIG. 4. Software system 300 and its components, including their connections, relationships, and functions, are meant to be exemplary only and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (RAM) 406 and on fixed storage (e.g., hard disk or flash memory) 410, includes a kernel or operating system (OS) 310.

The OS 310 manages low-level aspects of computer operation, including managing the execution of processes, memory allocation, file input and output (I/O), and device I/O. One or more application programs represented as 302A, 302B, 302C . . . 302N may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or another online service).

Software system 300 includes a graphical user interface (GUI) 315 for receiving user commands and data in a graphical (e.g., "point-and-click" or "touch gesture") fashion. These inputs, in turn, may be acted upon by system 300 in accordance with instructions from operating system 310 and/or application(s) 302. The GUI 315 also serves to display the results of operation from OS 310 and application (s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 4 is a block diagram that illustrates a computer system 400 upon which an embodiment of the invention may be implemented. Computer system 400 includes bus 402 or another communication mechanism for communicating information and a hardware processor 404 coupled with bus 402 for processing information. Hardware processor 404 may be, for example, a general-purpose microprocessor.

Computer system 400 also includes a main memory 406, such as a random access memory (RAM) or another dynamic storage device, coupled to bus 402 for storing information and instructions to be executed by processor 404. Main memory 406 also may be used for storing temporary variables or other intermediate information during the execution of instructions to be executed by processor 404. Such instructions, when stored in non-transitory storage media accessible to processor 404, render computer system 400 into a special-purpose machine that is customized to perform the operations specified in the instructions.

Computer system 400 further includes read-only memory (ROM) 408 or other static storage device coupled to bus 402 for storing static information and instructions for processor 404. A storage device 410, such as a magnetic disk, optical disk, or solid-state drive, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware, and/or program logic, which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infra-red detector can receive the data carried in the infra-red signal, and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426, in turn, provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420, and communication interface 418. In the Internet example, a server 430 might transmit a requested code for an application program through Internet 428, ISP 426, local network 422, and communication interface 418.

The received code may be executed by processor 404 as it is received and/or stored in storage device 410 or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community, while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment for use by consumers (either within or external to the organization, according to the cloud's public/private nature). Depending on the particular implementation, the precise definition of components or features provided by or within each cloud service layer can vary, but common examples include Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications and/or provision processing, storage, networks, and other fundamental computing resources, while an IaaS provider manages or controls the underlying physical cloud infrastructure (i.e., everything below the operating system layer). Database as a Service (DBaaS), in which consumers use a database server or Database Management System that is running upon a cloud infrastructure, while a DbaaS provider manages or controls the underlying cloud infrastructure, applications, and servers, including one or more database servers.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. One or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    executing, by a database management system (DBMS), a workload set of queries, the workload set of queries referencing a plurality of data portions, on which a plurality of operations of the workload set are performed to generate output for the workload set of queries, the executing the workload set comprising:
        performing a first operation, of a first operator from the plurality of operations, on a first data portion, of the plurality of data portions, in a current encoding format;
    collecting first operation execution statistics by recording measurements from the performing of the first operation on the first data portion in the current encoding format;
    based on the first operation execution statistics, obtaining one or more first feature values of a first plurality of feature values for a machine learning model of the first operator;
    executing the machine learning model of the first operator with the one or more first feature values as input to the machine learning model of the first operator;
    based on the executing the machine learning model of the first operator, generating a first estimate of benefit amount in performing the first operation on the first data portion in an alternative encoding format, different from the current encoding format, over the performing the first operation on the first data portion in the current encoding format.

2. The method of claim 1, further comprising:
    collecting second operation execution statistics by recording measurements from performing of a second operation, of a second operator from the plurality of operations, on the first data portion in the current encoding format;
    based on the second operation execution statistics, obtaining one or more second feature values of a second plurality of feature values for a machine learning model of the second operator;
    executing the machine learning model of the second operator with the one or more second feature values as input to the machine learning model of the second operator;
    based on the executing the machine learning model of the second operator, generating a second estimate of benefit amount in performing the second operation on the first data portion in the alternative encoding format, different from the current encoding format, over the performing the second operation on the first data portion in the current encoding format
    aggregating the first estimate of benefit amount for the first data portion with the second estimate of benefit amount for the first data portion to determine aggregate estimate benefit amount for the first data portion in the alternative encoding format.

3. The method of claim 2, further comprising, based on the aggregate estimate benefit amount for the first data portion, determining whether to encode the first data portion in the alternative encoding format or to continue using the first data portion in the current encoding format.

4. The method of claim 1, further comprising:
    based on executing a machine learning model of a second operator, generating a second estimate of benefit amount in performing a second operation with the second operator on a second data portion in the alternative encoding format, different from the current encoding format of the second data portion, over the performing the second operation on the second data portion in the current encoding format;
    determining a first estimate memory space cost for encoding the first data portion in the alternative encoding format by executing a memory machine learning model based on data statistics for the first data portion;
    determining a second estimate memory space cost for encoding the second data portion in the alternative encoding format by executing the memory machine learning model based on data statistics for the second data portion;
    based on the first estimate of benefit amount, the second estimate of benefit amount, the first estimate memory space cost and the second estimate memory space cost, determining whether the first data portion or the second data portion or both are to be encoded in the alternative encoding format.

5. The method of claim 1, further comprising:
    based on executing a plurality of machine learning models for different operators that includes the machine learning model of the first operator, generating a plurality of estimates of benefit amounts, each estimate in the plurality of estimates corresponding to a respective data portion in the plurality of data portions of the workload set;
    based on the plurality of estimates of benefit amounts, determining which one or more data portions from the plurality of data portions of the workload set are to be encoded in the alternative encoding format to speed the execution of the workload set.

6. The method of claim 1, wherein the one or more first feature values include one or more of: an actual number of entries processed, an actual number of entries returned, an actual maximum entry width processed, or an actual maximum entry width returned of the first data portion in the first operation.

7. The method of claim 1, further comprising:
    obtaining one or more second feature values of the first plurality of feature values for the machine learning model of the first operator;
    wherein the one or more second feature values are based on data statistics of the first data portion.

8. The method of claim 7, wherein the one or more second feature values include one or more of: a number of distinct values, an average entry length, cardinality, or a collation type of the first data portion.

9. The method of claim 1, further comprising:
obtaining one or more second feature values of the first plurality of feature values for the machine learning model of the first operator;
wherein the one or more second feature values are based on pre-execution statistics of the first data portion.

10. The method of claim 9, wherein the one or more second feature values include one or more of: an estimated number of entries processed, or an estimated number of entries returned of the first data portion in the first operation.

11. One or more non-transitory computer-readable media storing a set of instructions, wherein the set of instructions includes instructions, which when executed by one or more hardware processors, cause:
executing, by a database management system (DBMS), a workload set of queries, the workload set of queries referencing a plurality of data portions, on which a plurality of operations of the workload set are performed to generate output for the workload set of queries, the executing the workload set comprising:
performing a first operation, of a first operator from the plurality of operations, on a first data portion, of the plurality of data portions, in a current encoding format;
collecting first operation execution statistics by recording measurements from the performing of the first operation on the first data portion in the current encoding format;
based on the first operation execution statistics, obtaining one or more first feature values of a first plurality of feature values for a machine learning model of the first operator;
executing the machine learning model of the first operator with the one or more first feature values as input to the machine learning model of the first operator;
based on the executing the machine learning model of the first operator, generating a first estimate of benefit amount in performing the first operation on the first data portion in an alternative encoding format, different from the current encoding format, over the performing the first operation on the first data portion in the current encoding format.

12. The one or more non-transitory computer-readable media of claim 11, wherein the set of instructions further includes instructions, which when executed by said one or more hardware processors, cause:
collecting second operation execution statistics by recording measurements from performing a second operation, of a second operator from the plurality of operations, on the first data portion in the current encoding format;
based on the second operation execution statistics, obtaining one or more second feature values of a second plurality of feature values for a machine learning model of the second operator;
executing the machine learning model of the second operator with the one or more second feature values as input to the machine learning model of the second operator;
based on the executing the machine learning model of the second operator, generating a second estimate of benefit amount in performing the second operation on the first data portion in the alternative encoding format, different from the current encoding format, over the performing the second operation on the first data portion in the current encoding format
aggregating the first estimate of benefit amount for the first data portion with the second estimate of benefit amount for the first data portion to determine aggregate estimate benefit amount for the first data portion in the alternative encoding format.

13. The one or more non-transitory computer-readable media of claim 12, wherein the set of instructions further includes instructions, which when executed by said one or more hardware processors, cause, based on the aggregate estimate benefit amount for the first data portion, determining whether to encode the first data portion in the alternative encoding format or to continue using the first data portion in the current encoding format.

14. The one or more non-transitory computer-readable media of claim 11, wherein the set of instructions further includes instructions, which when executed by said one or more hardware processors, cause:
based on executing a machine learning model of a second operator, generating a second estimate of benefit amount in performing a second operation with the second operator on a second data portion in the alternative encoding format, different from the current encoding format of the second data portion, over the performing the second operation on the second data portion in the current encoding format;
determining a first estimate memory space cost for encoding the first data portion in the alternative encoding format by executing a memory machine learning model based on data statistics for the first data portion;
determining a second estimate memory space cost for encoding the second data portion in the alternative encoding format by executing the memory machine learning model based on data statistics for the second data portion;
based on the first estimate of benefit amount, the second estimate of benefit amount, the first estimate memory space cost and the second estimate memory space cost, determining whether the first data portion or the second data portion or both are to be encoded in the alternative encoding format.

15. The one or more non-transitory computer-readable media of claim 11, wherein the set of instructions further includes instructions, which when executed by said one or more hardware processors, cause:
based on executing a plurality of machine learning models for different operators that includes the machine learning model of the first operator, generating a plurality of estimates of benefit amounts, each estimate in the plurality of estimates corresponding to a respective data portion in the plurality of data portions of the workload set;
based on the plurality of estimates of benefit amounts, determining which one or more data portions from the plurality of data portions of the workload set are to be encoded in the alternative encoding format to speed the execution of the workload set.

16. The one or more non-transitory computer-readable media of claim 11, wherein the one or more first feature values include one or more of: an actual number of entries processed, an actual number of entries returned, an actual maximum entry width processed, or an actual maximum entry width returned of the first data portion in the first operation.

17. The one or more non-transitory computer-readable media of claim 11, wherein the set of instructions further includes instructions, which when executed by said one or more hardware processors, cause:

obtaining one or more second feature values of the first plurality of feature values for the machine learning model of the first operator;

wherein the one or more second feature values are based on data statistics of the first data portion.

18. The one or more non-transitory computer-readable media of claim 17, wherein the one or more second feature values include one or more of: a number of distinct values, an average entry length, cardinality, or a collation type of the first data portion.

19. The one or more non-transitory computer-readable media of claim 11, wherein the set of instructions further includes instructions, which when executed by said one or more hardware processors, cause:

obtaining one or more second feature values of the first plurality of feature values for the machine learning model of the first operator;

wherein the one or more second feature values are based on pre-execution statistics of the first data portion.

20. The one or more non-transitory computer-readable media of claim 19, wherein the one or more second feature values include one or more of: an estimated number of entries processed, or an estimated number of entries returned of the first data portion in the first operation.

* * * * *